United States Patent
Wrighton et al.

(10) Patent No.: US 11,095,191 B2
(45) Date of Patent: Aug. 17, 2021

(54) HELICAL MOTOR OIL CIRCULATION SYSTEM

(71) Applicant: Saudi Arabian Oil Company, Dhahran (SA)

(72) Inventors: Christopher Wrighton, Inverurie (GB); Jinjiang Xiao, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 59 days.

(21) Appl. No.: 16/242,795

(22) Filed: Jan. 8, 2019

(65) Prior Publication Data

US 2020/0220431 A1 Jul. 9, 2020

(51) Int. Cl.
*H02K 9/19* (2006.01)
*E21B 43/12* (2006.01)
*H02K 5/132* (2006.01)
*H02K 7/00* (2006.01)
*H02K 7/08* (2006.01)

(52) U.S. Cl.
CPC ............. *H02K 9/19* (2013.01); *E21B 43/128* (2013.01); *H02K 5/132* (2013.01); *H02K 7/003* (2013.01); *H02K 7/083* (2013.01)

(58) Field of Classification Search
CPC .......... H02K 9/19; H02K 5/132; H02K 7/003; H02K 7/083; H02K 1/32; H02K 9/00; H02K 9/005; H02K 9/18; H02K 5/20; H02K 9/193; H02K 9/197; E21B 43/128
USPC ....... 310/54, 52, 57, 58, 59, 60 R, 61, 60 A, 310/90.5, 112, 114
See application file for complete search history.

(56) References Cited

U.S. PATENT DOCUMENTS

| 5,319,272 A | * | 6/1994 | Raad | .................... H02K 11/042 310/54 |
| 6,741,000 B2 | | 5/2004 | Newcomb | |
| 8,067,865 B2 | | 11/2011 | Savant | |

(Continued)

FOREIGN PATENT DOCUMENTS

| CA | 1226325 | 9/1987 |
| DE | 102008001607 | 11/2009 |

(Continued)

OTHER PUBLICATIONS

International Search Report and Written Opinion issued in International Application No. PCT/US2019/068721 dated Mar. 23, 2020, 16 pages.

(Continued)

*Primary Examiner* — Ahmed Elnakib
(74) *Attorney, Agent, or Firm* — Fish & Richardson P.C.

(57) ABSTRACT

A motor includes a stator, a rotor shaft assembly carried within and supported to rotate by the stator and a closed-loop cooling system. The rotor shaft assembly includes a rotor separated from the stator by a radial gap. The rotor shaft assembly includes an elongate, hollow shaft about which the rotor is configured to rotate. The shaft includes an opening to flow fluid through a hollow portion of the shaft. The closed-loop cooling system includes multiple helical members positioned within the stator. The multiple helical members are configured to flow cooling liquid in a closed flow pathway defined by the radial gap, the opening and the hollow portion of the shaft during rotor rotation within the stator.

20 Claims, 2 Drawing Sheets

FIG. 1A

(56) References Cited

U.S. PATENT DOCUMENTS

| | | | | |
|---|---|---|---|---|
| 2011/0169353 A1* | 7/2011 | Endo | ........................ | H02K 9/19 |
| | | | | 310/59 |
| 2013/0119830 A1* | 5/2013 | Hautz | .................... | H02K 9/005 |
| | | | | 310/60 R |
| 2014/0265337 A1 | 9/2014 | Harding et al. | | |
| 2016/0164377 A1* | 6/2016 | Gauthier | .................. | H02K 9/19 |
| | | | | 310/54 |
| 2017/0343006 A1* | 11/2017 | Ehrsam | ................. | F04D 29/708 |
| 2017/0346371 A1* | 11/2017 | Gruetzner | ................ | H02K 1/32 |
| 2020/0220431 A1* | 7/2020 | Wrighton | ............... | H02K 7/083 |

FOREIGN PATENT DOCUMENTS

| | | | |
|---|---|---|---|
| DE | 102012022453 | | 5/2014 |
| DE | 102013200450 | | 7/2014 |
| DE | 102012205757 | | 8/2014 |
| JP | 2013110910 | * | 6/2013 |
| RU | 122531 | | 11/2012 |
| WO | 2014127035 | | 8/2014 |
| WO | 2018022198 | | 2/2018 |

OTHER PUBLICATIONS

GCC Examination Report in Gulf Cooperation Council Appln. No. GC 2020-38965, dated Apr. 27, 2021, 3 pages.

\* cited by examiner

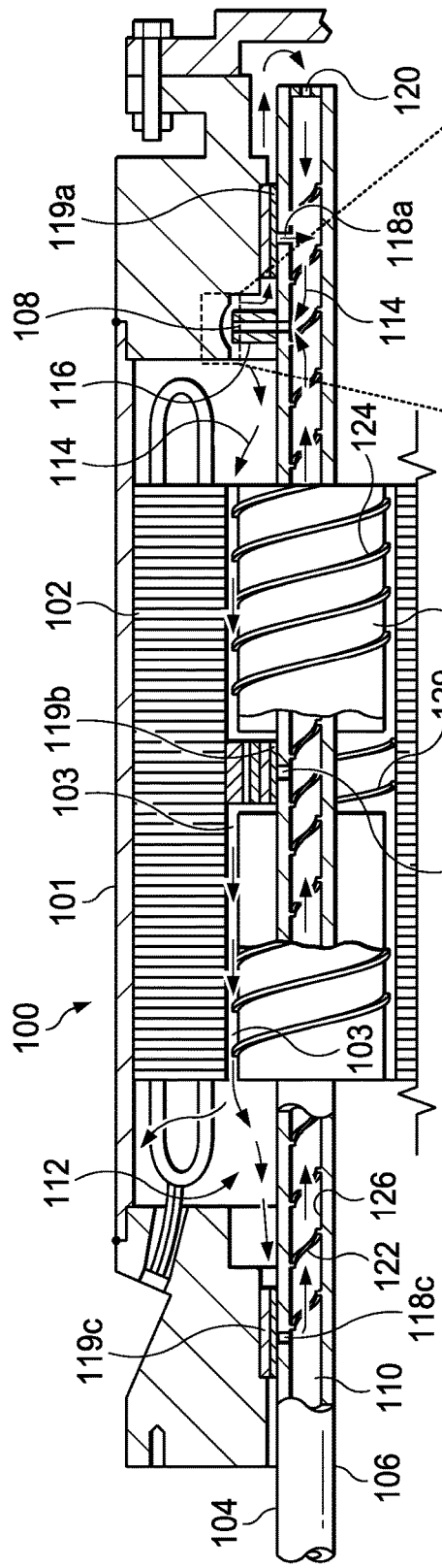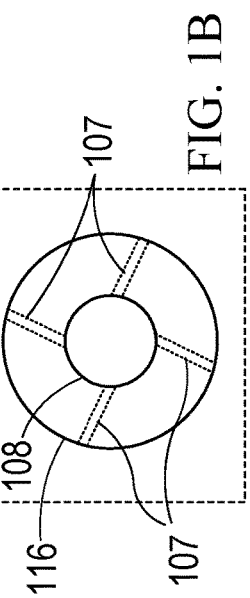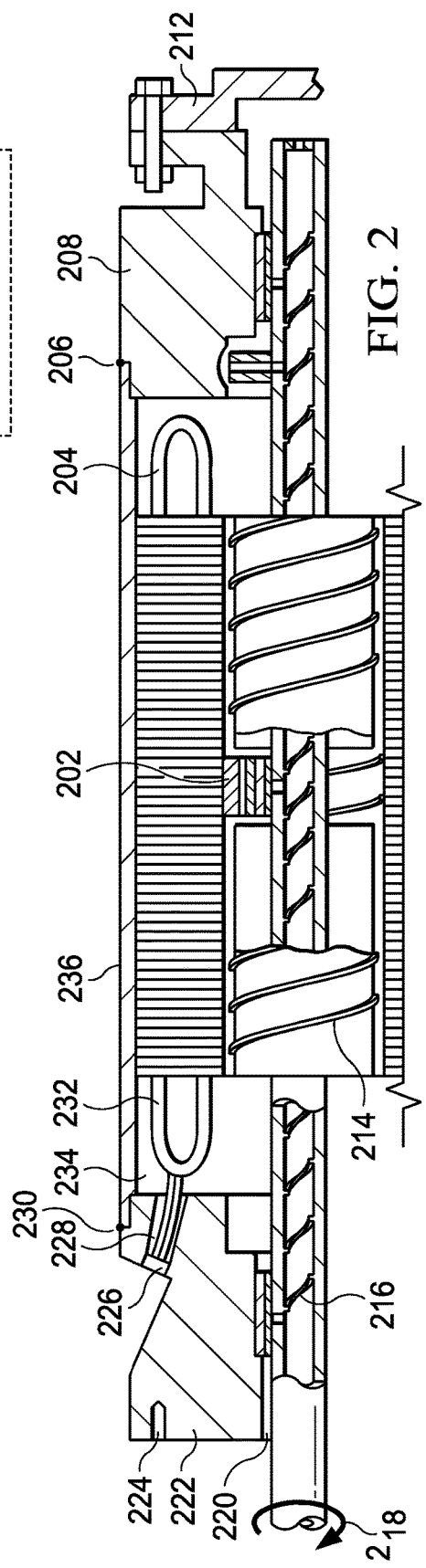

HELICAL MOTOR OIL CIRCULATION SYSTEM

TECHNICAL FIELD

This specification relates to electric machines, for example, motors, and more specifically to cooling electric machines during operation.

BACKGROUND

Formation fluids (for example, petroleum, natural gas, formation water, combinations of them) entrapped in subterranean zones can be produced (that is, raised to the surface) through wellbores drilled through the subterranean zones. In some instances, the pressure with which the formation fluids are entrapped is sufficient to produce the fluids. As the pressure decreases over time, secondary production techniques can be implemented to continue production. Artificially lifting the formation fluids to the surface using, for example, an electrical submersible pump (ESP) is one example of a secondary production technique. An ESP is driven by a motor to pump fluids from downhole locations towards the surface. Such a motor needs to be cooled for efficient operation and maximized life.

SUMMARY

This specification describes technologies relating to helical motor oil circulation system.

Certain aspects of the subject matter described here can be implemented as a motor. The motor includes a stator, a rotor shaft assembly carried within and supported to rotate by the stator and a closed-loop cooling system. The rotor shaft assembly includes a rotor separated from the stator by a radial gap. The rotor shaft assembly includes an elongate, hollow shaft about which the rotor is configured to rotate. The shaft includes an opening to flow fluid through a hollow portion of the shaft. The closed-loop cooling system includes multiple helical members positioned within the stator. The multiple helical members are configured to flow cooling liquid in a closed flow pathway defined by the radial gap, the opening and the hollow portion of the shaft during rotor rotation within the stator.

Aspects of the disclosure taken alone or combinable with any of the other aspects can include the following features. The opening is defined by a fluid slinger coupled to the shaft. The fluid slinger includes multiple inclined openings through which the cooling fluid flows from the hollow portion of the shaft to the radial gap.

Aspects of the disclosure taken alone or combinable with any of the other aspects can include the following features. The shaft includes additional opening in addition to the opening. Each additional opening is axially displaced from the first opening and formed on a circumferential surface of the shaft. Each additional opening is configured to flow the cooling liquid in the closed flow pathway defined by the radial gap and the hollow portion of the shaft during the rotor rotation. The closed flow pathway is further defined by the additional openings.

Aspects of the disclosure taken alone or combinable with any of the other aspects can include the following features. A number of the additional openings is equal to a number of radial bearings configured to support a radial load of the rotor during the rotor rotation. Each additional opening is covered by a respective radial bearing.

Aspects of the disclosure taken alone or combinable with any of the other aspects can include the following features. One of the radial bearings is an intermediate radial bearing. The motor further includes an intermediate rotor bearing housing carrying the intermediate radial bearing. The intermediate rotor bearing housing includes a fluid transfer opening configured to flow the cooling fluid. The closed flow pathway is further defined by the fluid transfer opening.

Aspects of the disclosure taken alone or combinable with any of the other aspects can include the following features. An axial opening is formed on an axial end of the shaft. The axial opening is configured to flow the cooling liquid in the closed flow pathway defined by the radial gap and the hollow portion of the shaft during the rotor rotation. The closed flow pathway is further defined by the axial opening.

Aspects of the disclosure taken alone or combinable with any of the other aspects can include the following features. The multiple helical members are configured to rotate in response to the rotor rotation to responsively flow the cooling fluid in the closed flow pathway according to an Archimedean screw principle.

Aspects of the disclosure taken alone or combinable with any of the other aspects can include the following features. The multiple helical members include a first set of helical members positioned in the hollow portion of the shaft of the rotor and a second set of helical members positioned in the radial gap between the rotor and the stator.

Aspects of the disclosure taken alone or combinable with any of the other aspects can include the following features. The first set of helical members are attached to an inner surface of the hollow portion of the shaft and configured to displace the cooling fluid axially through the shaft in response to the rotor rotation.

Aspects of the disclosure taken alone or combinable with any of the other aspects can include the following features. The second set of helical members are attached to an outer surface of the shaft and configured to displace the cooling fluid axially through the radial gap in response to the rotor rotation.

Aspects of the disclosure taken alone or combinable with any of the other aspects can include the following features. The second set of helical members is oriented opposite to the first set of helical members.

Aspects of the disclosure taken alone or combinable with any of the other aspects can include the following features. A pitch of the first set of helical members is different from a pitch of the second set of helical members.

Certain aspects of the subject matter described here can be implemented as a motor. The motor includes a stator, a rotor shaft assembly carried within and supported to rotate by the stator and a cooling system. The rotor shaft assembly includes a rotor. The rotor and the stator are separated by a radial gap. The rotor includes an elongate, hollow shaft about which the rotor shaft assembly is configured to rotate. The cooling system includes cooling fluid and multiple helical members positioned within the stator. The multiple helical members are configured to flow the cooling liquid in a closed flow pathway defined by the radial gap and the hollow portion of the shaft during rotor rotation within the stator.

Aspects of the disclosure taken alone or combinable with any of the other aspects can include the following features. A fluid slinger is coupled to the shaft. The fluid slinger defines an opening to the hollow portion. The fluid slinger includes multiple inclined openings through which the cooling fluid flows from the hollow portion of the shaft to the radial gap.

Aspects of the disclosure taken alone or combinable with any of the other aspects can include the following features. The shaft includes multiple axially displaced openings on a circumference of the hollow shaft through which the cooling fluid is configured to flow between the radial gap and the hollow portion. Each opening is configured to flow the cooling liquid in the closed flow pathway defined by the radial gap and the hollow portion of the shaft during the rotor rotation. The closed flow pathway is further defined by the multiple openings.

Aspects of the disclosure taken alone or combinable with any of the other aspects can include the following features. An axial opening is formed on an axial end of the shaft. The axial opening is configured to flow the cooling liquid in the closed flow pathway defined by the radial gap and the hollow portion of the shaft during the rotor rotation. The closed flow pathway is further defined by the axial opening.

Aspects of the disclosure taken alone or combinable with any of the other aspects can include the following features. The multiple helical members are configured to rotate in response to the rotor rotation to responsively flow the cooling fluid in the closed flow pathway according to an Archimedean screw principle.

Aspects of the disclosure taken alone or combinable with any of the other aspects can include the following features. The multiple helical members include a first set of helical members positioned in the hollow portion of the shaft of the rotor and a second set of helical members positioned in the radial gap between the rotor and the stator.

Aspects of the disclosure taken alone or combinable with any of the other aspects can include the following features. The first set of helical members are attached to an inner surface of the hollow portion of the shaft and configured to displace the cooling fluid axially through the shaft in response to the rotor rotation.

Aspects of the disclosure taken alone or combinable with any of the other aspects can include the following features. The second set of helical members are attached to an outer surface of the shaft and configured to displace the cooling fluid axially through the radial gap in response to the rotor rotation.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B are schematic diagrams of an interior portion of a motor with a cooling and lubrication system.

FIG. 2 is another schematic diagram of the interior portion of the motor with the cooling and lubrication system.

Like reference numbers and designations in the various drawings indicate like elements.

DETAILED DESCRIPTION

Figure 3:
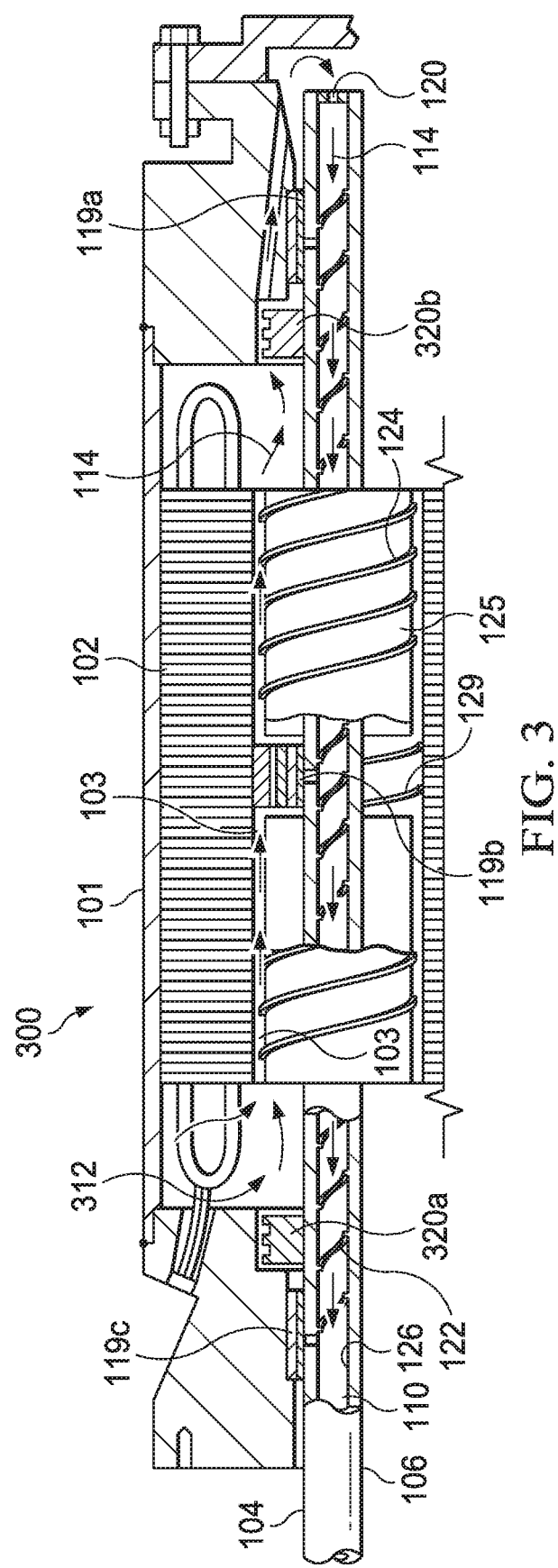
FIG. 3 is a schematic diagram of an interior portion of an alternative implementation of a motor with a cooling and lubrication system.

This specification describes dielectric lubrication and cooling fluid flow circulation around motors, for example, long, skinny motors such as ESPs. Helical structures that include grooves or ridges (or both) are formed on an outer surface of a motor rotor or inner surface of a motor stator or both. Helical structures are also formed on an inner surface of a hollow rotor shaft. During rotor rotation, the helical structures cooperate with each other to flow cooling fluid, for example, dielectric oil, in a closed flow pathway defined by a hollow portion within the rotor shaft and the radial gap that separates the rotor and the stator. As described later with reference to the following figures, the closed fluid flow pathway is further defined by one or more openings in the shaft through which the cooling fluid flows.

In this specification, the helical cooling and lubrication system is described as being implemented with a motor, for example, an ESP motor. In some implementations, the helical cooling and lubrication system can be used to cool and lubricate any electrical machine, for example, a generator. More generally, the helical cooling and lubricating system described in this specification can be implemented to cool and lubricate any machine in which a hollow internal shaft rotates within an outer structure and defines a radial gap separating the internal shaft from the outer structure. In some implementations, the helical cooling and lubrication system described here can be implemented to cool and lubricate radial bearings.

The helical cooling system described here can improve cooling fluid circulation, and lubrication and cooling of internal motor parts along an entire length of a motor. The helical structures described here can decrease or eliminate pressure drop experienced by the cooling fluid as the fluid flows through the radial gap between the stator and the rotor along the hollow rotor shaft.

FIG. 1A is a schematic diagram of an interior portion of a motor 100 with a cooling system. In some implementations, the motor 100 is a downhole-type motor, that is, a motor that is designed and constructed to be operated in downhole conditions. For example, the construction of its components are configured to withstand the impacts, scraping and other physical challenges the motor 100 will encounter while being passed hundreds of feet or meters or even multiple miles or kilometers into and out of a wellbore. Beyond just a rugged exterior, this encompasses having certain or all portions of the motor being ruggedized to be shock resistant and remain fluid tight during such physical challenges and during operation. Additionally, the motor 100 is configured to withstand and operate for extended periods of time (for example, multiple weeks, months or years) at the pressures and temperatures experienced in a well, which temperatures can exceed 400 degrees Fahrenheit or 200 degrees Centigrade. The motor 100 can be configured to interface with one or more of the common deployment systems, such as jointed tubing (that is, lengths of tubing joined end-to-end, threadingly or otherwise), coiled tubing (that is, not jointed tubing, but rather a continuous, unbroken and flexible tubing formed as a single piece of material), cable deployed (that is 3 conductor phases in a mechanically reinforced sheath, sometime metal), or wireline with an electrical conductor (that is, a monofilament or multifilament wire rope with one or more electrical conducts, sometimes called e-line), and thus have a corresponding connector.

The motor 100 includes a stator 102. The stator 102 is carried within and supported by the stator housing 101. The stator 102 and the rotor shaft assembly 104 are separated by a radial gap 103. The rotor shaft assembly 104 includes an elongate, hollow shaft 106 about which one or more rotors 125 is configured to rotate within the stator 102. The shaft 106 includes an opening 108 to flow fluid through a hollow portion 110 of the shaft 106. The motor 100 includes a closed-loop cooling and lubrication system 112 that includes multiple helical members positioned within the stator 102 and hollow shaft 106. As described later, some of the helical members are positioned within the stator 102 between an inner surface of the stator 102 and an outer surface of the rotor 125. Some of the helical members are positioned within the stator 102 within the hollow portion 110 of the rotor shaft 106. The multiple helical members can flow cooling and lubricating liquid (for example, dielectric oil), represented schematically by arrows 114 in FIG. 1A, in a closed flow pathway defined by the radial gap 103, the opening 108 and the hollow portion 110 of the shaft 106. The flow pathway is closed in that the pathway is internal to the motor 100. Expansion/contraction of the close loop dielectric oil or alternative cooling and lubrication fluid is managed by the motor protector/reservoir/accumulator, which is adjacent to and fastens onto the motor. Oil is added to ESP motor and Protector/oil accumulator on surface during ESP assembly. During this process air is purged from the motor and protector. As the ESP is run in hole to set depth, the ambient temperature increases and the dielectric oil expands and is released into the well bore until differential pressure is approximately 3 pounds per square inch (psi). If well bore fluids cool, then well bore fluids are allowed to enter the protector until differential pressure is again approximately 3 psi. This is known as a pressure balanced system.

The motor 100 includes a fluid slinger 116 coupled to the shaft 106 and that defines the opening 108. The fluid slinger 116 can be a disc with inclined holes 107 (FIG. 1B). In some implementations, during rotor rotation, the helical members push the cooling fluid through the hollow portion 110 toward the opening 108 that is surrounded by the fluid slinger 116 on an outer surface of the shaft 106. As the cooling fluid 114 flows through the opening 108, the inclined holes 107 in the fluid slinger 116 pushes or "slings" the cooling fluid 114 into the radial gap between the stator 102 and the one or more rotors 125. The cooling fluid 114 flows through the radial gap 103 and depending on dynamic pressure along the length of the motor 100, the cooling fluid will flow into or out of the hollow portion 110 of shaft 106 through additional openings (for example, openings 118a, 118b, 118c), which describe oil lubrication hole into radial bearings (for example, radial bearings 119a, 119b or 119c) between the one or more rotors 125 and at either end of the motor 100 (drive end and non-drive end).

Each additional opening (for example, openings 118a, 118b, 118c) are axially displaced from the opening 108 and formed on a circumferential surface of the shaft 106 at locations of the radial bearings 119a-119c between the rotors 125. The schematic diagram in FIG. 1A shows three additional openings. The shaft 106 can include more or fewer than three openings depending, for example, on the length of the shaft 106, and the number of rotors 125.

The motor 100 includes an axial opening 120 formed on an axial end of the shaft 106. The axial opening 120 can be formed on a top end, that is, the end of the shaft 106 nearer the surface of a wellbore in which the motor 100 is disposed, or a bottom end of the shaft 106, that is, the end opposite the top end. In some implementations, the opening 108 can be formed and the fluid slinger 116 can be attached nearer the end of the shaft 106 in which axial opening 120 is formed. In general, the axial opening 120 is at the non-drive end of the motor 100. In some implementations, a filter (not shown) can be included in the axial opening 120 to prevent debris from circulating through the radial bearings. The axial opening 120 can be formed, for example, by drilling on the axial end face of the rotor shaft 106 into the hollow portion 110. In some implementations, the axial opening 120 can have a constant diameter along a thickness of the shaft 106 through which the opening is formed. The closed flow pathway is further defined by the axial opening 120. That is, during rotor rotation, the cooling fluid 114 can flow through the hollow portion 110, one or more of the additional openings 118a, 118b, 118c, the axial opening 120, the opening 110 and the radial gap between the stator 102 and the one or more rotors 125.

As described earlier, the multiple helical members can flow the cooling fluid 114 through the closed flow pathway. To do so, the multiple helical members can rotate during rotor rotation and displace or transport the fluid through the radial gap and through the hollow portion 110 according to an Archimedean screw principle. The multiple helical members includes helical member 122 positioned in the hollow portion 110 of the shaft 106. Helical member 122 can be attached to an inner surface 126 of the hollow portion 110 of the shaft 106 and can project from the inner surface 126 into the interior region of the hollow portion 110. In implementations in which the helical member 122 is formed as a groove, the helical member 122 can be machined or groove rolled onto a surface of the shaft 106. In implementations in which the helical member 122 is formed as an extension, the helical member 122 can be machined or scribed or formed as a ridge (for example, using a bead of weld) or a coil of spring steel located on one end and stretched out over the length and retained at the other end. The pitch of the helical member 122 can vary from coarse to fine based, in part, on the quantity of cooling and lubrication desired. The multiple helical members include a second set of helical members 124 on the rotor outside diameter. This set of helical members 124 are attached to outer surface of rotor 125 in turn attached to the shaft 106 and can be raised above or recessed into the outer surface 125 facing into the radial gap between rotor 125 and stator 102. In addition, a third set of helical members 129 can be raised above or recessed into the inner surface of the stator 102. Each of the second and third set of helical members can have similar structural details as and can be manufactured using similar techniques as the first set of helical members 122.

The first, second and third helical members 122, 124 and 129 are oriented in opposite hands to ensure they all work together. That is, if helical member 122 is oriented as a left hand helix, then the rotor helix 124 would be a right hand and the stator helix 129 would be left hand. Each set of helix could be single or multiple start. Each set of helical members support each other in the circulation of cooling fluid by implementing an Archimedean screw principle. That is, when helical members 110 and 124 rotate, the portion of the helical members that extends transverse to a longitudinal axis of the rotor 104 carries or pushes a volume of the cooling fluid in a direction of rotation of the helical members. Static helical member 129 assists this process by reducing pressure drop on the inside diameter of the stator. In this manner, the fluid 114 is transported through the hollow portion 110 and the radial gap 130.

When the shaft 106 rotates, the first set of helical members 122 can rotate with the shaft 106 and carry the cooling fluid 114 in the hollow portion 110 along an axial length of the shaft 106. The direction in which the first set of helical members 122 carries the cooling fluid 114 can depend, in part, on the orientation of the helix (that is, right hand helix or left hand helix) and the rotational direction of the shaft 106 (that is, clockwise or counter-clockwise). The first set of helical members 122 can carry the cooling fluid 114 towards one or more of the openings along the inner surface 126 of the hollow portion 110 or the axial opening 120. The openings can allow the cooling fluid 114 to pass from the hollow portion 110 into the radial gap between the stator 102 and the rotor 125. The fluid slinger 116 surrounding the opening 108 adds energy to the lubricating and cooling fluid can move fluid 114 into the radial gap and onto other components of the motor 100, as described later with reference to FIG. 3. In the radial gap, the second set of helical members 124 can rotate with the shaft 106 and carry the cooling fluid 114 in the radial gap along the axial length of the stator 102. Because the second set of helical members 124 is oriented opposite the first set of helical members 122, the flow direction of the cooling fluid 114 in the radial gap is opposite that of the flow direction in the hollow portion 106. In some implementations, the pitch of the two helixes (that is, the first set of helical members 122 and the second and third set of helical members 124 and 129) can be the same or different. For example, the pitches can be selected such that the time taken for the cooling fluid 114 to travel through the hollow portion 110 and the radial gap is the same. The second set of helical members 124 can carry the cooling fluid 114 towards one or more of the openings along the outer surface 128 of the shaft 106 or the axial opening 120. The openings can allow the cooling fluid 114 to pass from the radial gap into the hollow portion 110. In some implementations, heat carried by the cooling fluid can be transferred to produced fluids flowing over the motor 100. In this manner, the cooling fluid 114 can continue to flow in the closed fluid pathway.

FIG. 2 is another schematic diagram of the interior portion of the motor 100 with the cooling system 112. The schematic diagram shown in FIG. 2 shows additional motor components relative to the schematic diagram shown in FIG. 1A. In particular, the schematic diagram shown in FIG. 2 shows an intermediate radial bearing housing 202 to house the radial bearing 119b. The intermediate radial bearing housing 202 includes an opening through which the cooling fluid 114 in the radial gap can flow. The schematic diagram also shows a stator winding overhangs 232 and 204 in the drive-end and non-drive-end of the motor 102, respectively. The overhangs are positioned in a cavity 234 fluidically connected to the radial gap and through which the cooling fluid 114 flows before flowing into the hollow portion 110. In the schematic diagram shown in FIG. 2, the second set of helical members is a right hand helix 214 and the first set of helical members is a left hand helix 216 for the rotor shaft that rotates in a clockwise direction 218 when viewed from an end of the rotor shaft. The schematic diagram further shows a region 220 to exchange fluids with protector. The schematic diagram also shows components of a motor such as a head 222 with a pothead, tapped fastening holes 224, a pothead 226, motor tails 228, motor welds 230 and 206 and an end cap 212.

FIG. 3 is a schematic diagram of an interior portion of an alternative implementation of a motor 300 with a cooling and lubrication system 312. The motor 300 includes several components that are identical to those of the motor 100 described with reference to FIG. 1A. In place of the fluid slinger 116 of the motor 100, the motor 300 includes one or more helical screw pumps (for example, helical screw pumps 320a, 320b) to add energy to the lubricating and cooling fluid 114 as the fluid circulates into the radial gap 103 between the stator 102 and the one or more rotors 125. For illustration, the rotor shaft assembly 104 of the motor 300 is shown rotating counter-clockwise as opposed to the rotor shaft assembly 104 of the motor 100 which is shown rotating clockwise. One end of each helical screw pump is attached to an outer surface of the shaft 106. A helical groove is defined on an opposite end of each helical screw pump. In operation, as the rotor shaft assembly 104 rotates, the helical grooves of the screw pumps provide energy to circulate the cooling fluid 114.

Thus, particular implementations of the subject matter have been described. Other implementations are within the scope of the following claims.

The invention claimed is:

1. A motor comprising:
a stator;
a rotor shaft assembly carried within and supported to rotate by the stator, the rotor shaft assembly comprising a rotor separated from the stator by a radial gap, the rotor shaft assembly comprising an elongate, hollow shaft about which the rotor is configured to rotate, the shaft comprising an opening to flow cooling fluid through a hollow portion of the shaft; and
a closed-loop cooling system comprising a plurality of helical members positioned within the stator, the plurality of helical members configured to flow cooling liquid in a closed flow pathway defined by the radial gap, the opening and the hollow portion of the shaft during rotor rotation within the stator, wherein the opening is defined by a fluid slinger coupled to the shaft, wherein the fluid slinger comprises a disc attached to a circumferential surface of the shaft.

2. The motor of claim 1, wherein the disc comprises a plurality of inclined openings through which the cooling fluid flows from the hollow portion of the shaft to the radial gap.

3. The motor of claim 1, wherein the shaft comprises additional openings in addition to the opening, each additional opening axially displaced from the first opening and formed on the circumferential surface of the shaft, each additional opening configured to flow the cooling liquid in the closed flow pathway defined by the radial gap and the hollow portion of the shaft during the rotor rotation, wherein the closed flow pathway is further defined by the additional openings.

4. The motor of claim 3, wherein a number of the additional openings is equal to a number of radial bearings configured to support a radial load of the rotor during the rotor rotation, each additional opening covered by a respective radial bearing.

5. The motor of claim 3, wherein one of the radial bearings is an intermediate radial bearing, wherein the motor further comprises an intermediate rotor bearing housing carrying the intermediate radial bearing, wherein the intermediate rotor bearing housing comprises a fluid transfer opening configured to flow the cooling fluid, wherein the closed flow pathway is further defined by the fluid transfer opening.

6. The motor of claim 3, further comprising an axial opening formed on an axial end of the shaft, the axial opening configured to flow the cooling liquid in the closed flow pathway defined by the radial gap and the hollow portion of the shaft during the rotor rotation, wherein the closed flow pathway is further defined by the axial opening.

7. The motor of claim 1, wherein the plurality of helical members are configured to rotate in response to the rotor rotation to responsively flow the cooling fluid in the closed flow pathway according to an Archimedean screw principle.

8. The motor of claim 1, wherein the plurality of helical members comprises:
a first plurality of helical members positioned in the hollow portion of the shaft of the rotor; and a second plurality of helical members positioned in the radial gap between the rotor and the stator.

9. The motor of claim 8, wherein the first plurality of helical members are attached to an inner surface of the hollow portion of the shaft and configured to displace the cooling fluid axially through the shaft in response to the rotor rotation.

10. The motor of claim 8, wherein the second plurality of helical members are attached to an outer surface of the shaft and configured to displace the cooling fluid axially through the radial gap in response to the rotor rotation.

11. The motor of claim 10, wherein the second plurality of helical members is oriented opposite to the first plurality of helical members.

12. The motor of claim 8, wherein a pitch of the first plurality of helical members is different from a pitch of the second plurality of helical members.

13. The motor of claim 1, wherein the closed flow pathway is further defined by the plurality of openings.

14. The motor of claim 13, further comprising an axial opening formed on an axial end of the shaft, the axial opening configured to flow the cooling liquid in the closed flow pathway defined by the radial gap and the hollow portion of the shaft during the rotor rotation, wherein the closed flow pathway is further defined by the axial opening.

15. A motor comprising:
a stator;
a rotor shaft assembly carried within and supported to rotate by the stator, the rotor shaft assembly comprising a rotor, the rotor and the stator separated by a radial gap, the rotor comprising an elongate hollow shaft about which the rotor shaft assembly is configured to rotate;
a cooling system comprising: cooling fluid, and a plurality of helical members positioned within the stator, the plurality of helical members configured to flow the cooling fluid in a closed flow pathway defined by the radial gap and the hollow portion of the shaft during rotor rotation within the stator;
wherein the hollow shaft comprises a plurality of axially displaced openings on a circumference of the hollow shaft through which the cooling fluid is configured to flow between the radial gap and the hollow portion of the shaft, each opening configured to flow the cooling fluid in the closed flow pathway defined by the radial gap and the hollow portion of the shaft during the rotor rotation, wherein a number of the plurality of axially displaced openings is equal to a number of radial bearings configured to support a radial load of the rotor during the rotor rotation, each opening covered by a respective radial bearing.

16. The motor of claim 15, further comprising a fluid slinger coupled to the shaft, wherein the fluid slinger defines an opening to the hollow portion, wherein the fluid slinger comprises a disc defining an opening through which the cooling fluid flows from the hollow portion of the shaft to the radial gap.

17. The motor of claim 15, wherein the plurality of helical members are configured to rotate in response to the rotor rotation to responsively flow the cooling fluid in the closed flow pathway according to an Archimedean screw principle.

18. The motor of claim 17, wherein the plurality of helical members comprises:
a first plurality of helical members positioned in the hollow portion of the shaft of the rotor; and
a second plurality of helical members positioned in the radial gap between the rotor and the stator.

19. The motor of claim 18, wherein the first plurality of helical members are attached to an inner surface of the hollow portion of the shaft and configured to displace the cooling fluid axially through the shaft in response to the rotor rotation.

20. The motor of claim 18, wherein the second plurality of helical members are attached to an outer surface of the shaft and configured to displace the cooling fluid axially through the radial gap in response to the rotor rotation.

* * * * *